(12) United States Patent
Dohrmann

(10) Patent No.: US 8,348,675 B2
(45) Date of Patent: Jan. 8, 2013

(54) APPARATUS AND METHOD FOR DELIVERY OF INSTRUCTIONAL INFORMATION

(75) Inventor: Bernhard Dohrmann, Huntsville, AL (US)

(73) Assignee: Life Success Academy, Madison, AL (US)

( * ) Notice: Subject to any disclaimer, the term of this patent is extended or adjusted under 35 U.S.C. 154(b) by 2214 days.

(21) Appl. No.: 09/981,287

(22) Filed: Oct. 18, 2001

(65) Prior Publication Data

US 2002/0132216 A1    Sep. 19, 2002

Related U.S. Application Data

(60) Provisional application No. 60/241,359, filed on Oct. 19, 2000, provisional application No. 60/282,877, filed on Apr. 11, 2001.

(51) Int. Cl.
*G09B 3/00* (2006.01)
*G09B 7/00* (2006.01)

(52) U.S. Cl. ........ 434/326; 434/350; 715/730; 715/732; 715/867; 715/844; 715/814

(58) Field of Classification Search .............. 434/307 R, 434/322–323, 324, 350, 365, 362; 715/730–732, 715/867, 844, 814; 345/700, 716, 719, 727, 345/730, 733, 734, 759, 761, 781, 788
See application file for complete search history.

(56) References Cited

U.S. PATENT DOCUMENTS

| | | | | |
|---|---|---|---|---|
| 4,876,657 A | * | 10/1989 | Saito et al. | ..................... 715/753 |
| 5,002,491 A | * | 3/1991 | Abrahamson et al. | ........ 434/322 |
| 5,231,578 A | | 7/1993 | Levin et al. | |
| 5,303,042 A | * | 4/1994 | Lewis et al. | ................ 348/14.01 |
| 5,310,349 A | * | 5/1994 | Daniels et al. | ................. 434/350 |
| 5,448,287 A | * | 9/1995 | Hull | ................................. 348/39 |
| 5,488,385 A | * | 1/1996 | Singhal et al. | ................. 345/3.1 |
| 5,574,574 A | * | 11/1996 | Kawamura | .................... 358/468 |
| 5,694,141 A | * | 12/1997 | Chee | .............................. 345/3.1 |
| 5,746,599 A | * | 5/1998 | Lechner | ........................... 434/44 |
| 5,823,786 A | | 10/1998 | Easterbrook | |
| 5,850,250 A | | 12/1998 | Konopka et al. | |
| 5,859,623 A | * | 1/1999 | Meyn et al. | .................... 715/730 |
| 5,920,674 A | * | 7/1999 | Okita et al. | ..................... 386/52 |
| 5,964,064 A | * | 10/1999 | Goddard et al. | ..................... 52/8 |
| 6,034,652 A | * | 3/2000 | Freiberger et al. | ............ 715/730 |
| 6,088,004 A | * | 7/2000 | Domae et al. | .................. 345/1.1 |
| 6,106,298 A | * | 8/2000 | Pollak | ............................ 434/29 |
| 6,130,668 A | | 10/2000 | Stein | |

(Continued)

FOREIGN PATENT DOCUMENTS

JP    2000285263 A  * 10/2000

*Primary Examiner* — Nikolai A Gishnock
(74) *Attorney, Agent, or Firm* — Kunzler Law Group, PC

(57) ABSTRACT

An instructional information delivery system and method based on the storing and retrieving information via an eye-ear-body system optimizes learning. Courses are prepared and presented with help from multimedia tools that present different aspects of the instructional materials. The system and the method complement instructor-led lessons by emphasis on information delivery according to the process of attention to and retention of information by the brain. The information delivery system and method provides for multiple display screens and speakers receiving instructional information based on data that is manipulated according to a set of rules in a multimedia environment. The system allows real time feedback by instructor's input, control and override so that the lesson is flexible and responsive to the classroom if changes in the learning environment occur.

36 Claims, 7 Drawing Sheets

U.S. PATENT DOCUMENTS

| | | | |
|---|---|---|---|
| 6,298,218 B1 * | 10/2001 | Lowe et al. | 455/66.1 |
| 6,356,288 B1 * | 3/2002 | Freeman et al. | 715/867 |
| 6,397,036 B1 * | 5/2002 | Thean et al. | 434/350 |
| 6,398,556 B1 * | 6/2002 | Ho et al. | 434/219 |
| 6,411,796 B1 * | 6/2002 | Remschel | 434/350 |
| 6,559,838 B1 * | 5/2003 | Lonoce et al. | 345/212 |
| 6,585,518 B1 * | 7/2003 | Jenkins et al. | 434/236 |
| 6,647,119 B1 * | 11/2003 | Slezak | 381/17 |
| 6,669,346 B2 * | 12/2003 | Metcalf | 353/94 |
| 6,957,398 B1 * | 10/2005 | Nayeri | 715/867 |

* cited by examiner

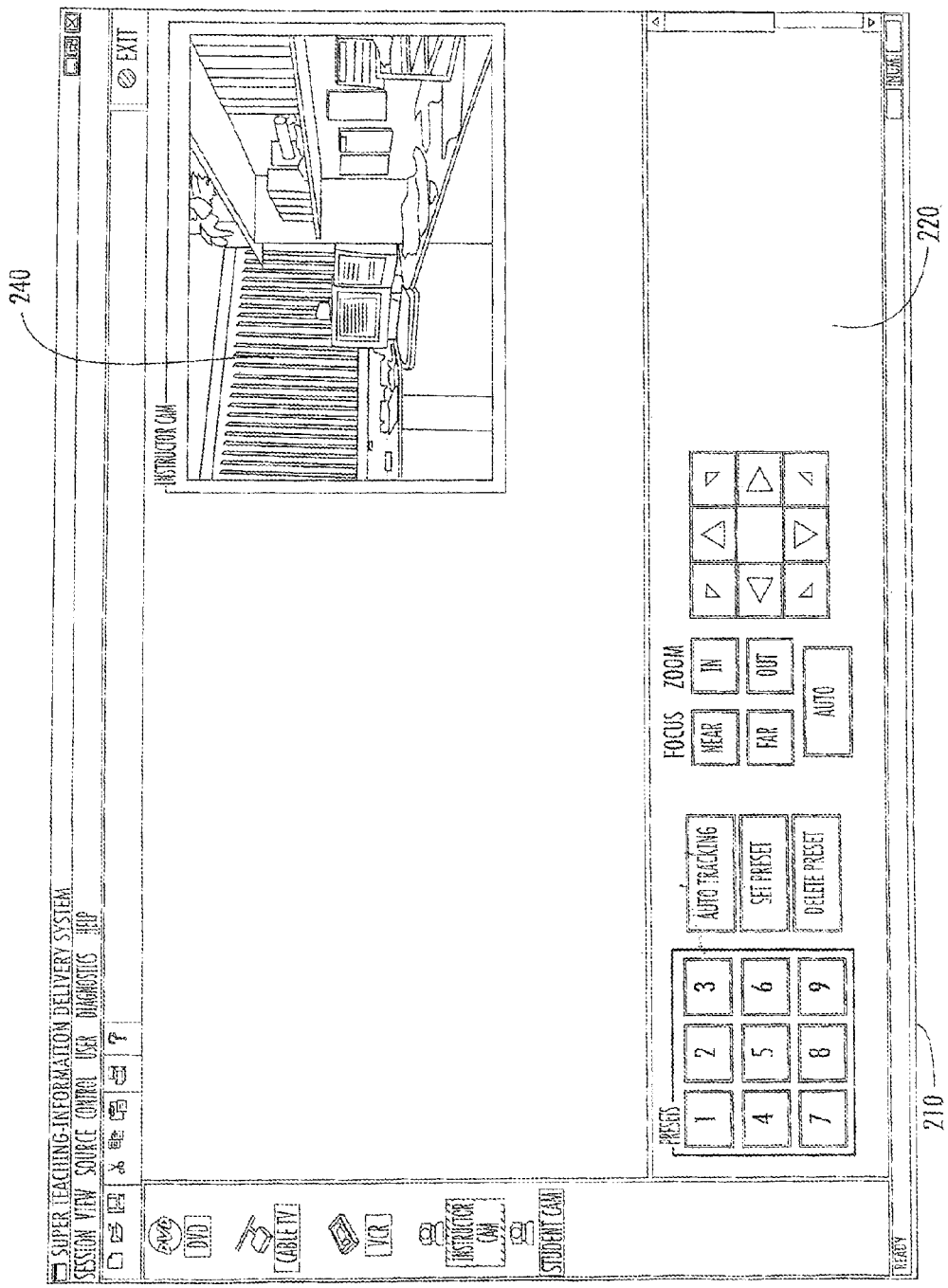

APPARATUS AND METHOD FOR DELIVERY OF INSTRUCTIONAL INFORMATION

CROSS REFERENCE TO RELATED APPLICATIONS

This Application claims priority from, and is related to, U.S. Provisional Application No. 60/241,359, filed Oct. 19, 2000 by inventor Bernhard Dohrmann, entitled "APPARATUS AND METHOD FOR SUPER TEACHING". This Application also claims priority from, and is related to, U.S. Provisional Application No. 60/282,877, filed Apr. 11, 2001 by inventor Bernhard Dohrmann, entitled "ENHANCED APPARATUS AND METHOD FOR SUPER TEACHING". The contents of the Provisional Applications are hereby incorporated by reference in its entirety.

CROSS REFERENCE TO CD-ROM APPENDICES

This Application contains an Appendix containing two copies of a CD-ROM, containing instructions for implementations of various portions of the computer programs used to carry out the invention disclosed herein. The content of the CD-ROM is described in more detail in paper Appendix A attached to this document.

FIELD OF THE INVENTION

The invention relates generally to the field of teaching, and more specifically, to an interactive multimedia information delivery system for teaching.

BACKGROUND OF INVENTION

Learning has become more than lectures, taking notes, repetitions and dull, non-stimulating classrooms. Two of the most important elements of learning are "DESIRE and INTEREST." By stimulating students' interest, the level of enthusiasm and motivation increases, and students will less likely become distracted or disinterested. Consequently, interested students will make more effort in preparation for involvement in, and attendance at, classroom lessons, which will enhance the effectiveness of the educational system. The role of instructors in classrooms is to create the groundwork for student motivation by inspiring them, piquing their imaginations, stimulating their interests and tapping into their creativity.

Most education experts agree that success in the educational process depends on the level of retention of the material to be learned, based on the fact that the brain does not pay attention to everything. The rate of retention drops where there are uninteresting, boring or emotionally-flat lessons, since the brain simply drifts off to find other stimuli that are more interesting. Students will not remember dull, colorless or monotonous materials. If the classroom environment is creative, enlightening, inspiring and motivating, the goal of creating an effective and positive learning atmosphere is achieved. If the cold, lifeless and boring classroom can be converted into a vibrant, interesting and stimulating multimedia experience, students will have greater interest in attending classes and faculty effectiveness will improve dramatically. A successful educational experience should be "fun" for both faculty and students in day-to-day learning, but "fun" is often "frowned upon" by some educators. Students pay more attention to lessons that are presented in a way that is "fun." Escalated student interest becomes the stimulus for increased improvements in other learning techniques and resources such as field trips, research and independent studies.

In the past, when computers and interactive software moved into classrooms, educators thought superior performance would result and anticipated that computers and interactive software would positively impact learning, and that student test scores would dramatically improve with these tools and methods. However, the results were very different from what was originally expected. It has become widely accepted that computer technology in the classroom fails to teach, accelerate overall comprehension, or to hold student attention over any length of time. There is no doubt that live instructors teach learners and have no substitute or replacement in the learning process for human beings. It is impossible to automate live instruction since only live instructors can sense the mood of the student body and attend, by instinct, and artistry to the velocity, momentum and acceleration of day-to-day learning. Humans are social learners and require social learning in classrooms in which the meaning of the social experience in terms of context, community, state and nation may be fully understood. With this rapid realization, computers are mainly used to assist students to CONFIRM that which is already LEARNED rather than to impart the learning itself.

Later, virtual-reality devices provided no further improvement over computers. Therefore, the mere application of computers in the classroom did not make much improvement and represented misapplied resources, wasted opportunity dollars, and can now be defined as a mistake based on performance evaluation and test scores. Need for a teaching tool that would employ the benefits of new technologies and enhance learning was considered vital.

DISCLOSURE OF INVENTION

The present invention provides to instructors and students, alike, a comprehensive tool for information delivery and education that conforms the classroom into a conduit of exciting teaching and learning possibilities. The development of this innovative invention, which is called "Super Teaching," is based on research results which indicate that for human beings, each a highly differential learner, tri-screen delivery of information works to elevate human concentration patterns by "leading" the mind, rather than having the mind on "pause" waiting for information to move forward. Technology-assisted teaching produces superior results evidenced by improved test scores when compared to those without technology assistance. The present system and method provides a saturation learning environment that stimulates both left and right sides of the brain. In this type of learning, with more integrated involvement from an instructor and a multimedia system, greater levels of retention are obtained when compared to instructor assistance or the automated system is missing from the classroom experience.

Another aspect of the invention is based on its ability to implant stronger and more powerful impressions in more brain locations. Thus, the possibility of dynamic and involuntary recall of newly-acquired information is increased. These conclusions are drawn, in part, from the study of brain waves, and in part from the work citing the summary total of redundant display of information using instructor-assisted resource of the present invention, vs. when such assistance is not provided. Information is presented repetitively, both in auditory as well as visual format, which is retained and recalled more effectively.

According to another aspect of the invention, the brain, operating within a classroom environment that is equipped with the present inventions, the focus is on teaching led by the information delivery system at a higher level. The well-known issue of "mind wandering" within any context of human communication is significantly defeated within an assisted environment. The brain is held on the topic by random patterns presented to human senses using the present information delivery system. The obtained effect is induced without significant retraining of the instructor as to content or sequence. The instructor proceeds to deliver content and sequence, as before, while the student body demonstrates visible and invisible measurable gains related to attention/input of information and retention/output of information. Existing lesson plans are integrated into the system and applied without modification.

Another aspect of the invention relates to a method and apparatus for information delivery that enables learning at fast rates with an improved degree of retention. Expectancy and attitude, each a huge contributor to the learning process, enhances learning, especially when instructor assistance and the present invention are combined in the classroom environment.

Another aspect of the invention relates to a system for providing integrated-information delivery capabilities from audio and video sources into screens and speakers in a classroom. The controlling unit provides sequence, duration and content modifications to the display system from the sources that provide data. Each source communicates with the screens, the speakers and the control unit for receiving control commands and transferring data signals.

Yet another aspect of the invention provides for the software configured to control the content and sequence of information display on display screens. The software includes databases, control commands for each data-source device and specific conditions for formatting the audio and visual display.

In another aspect of the invention, user-friendly graphical user interface provides active controls for each data source. A control panel, exclusive to a particular data-source device is displayed on a screen, which is used by the instructor to modify the way data from that source is manipulated and displayed. The interface provides for an active-source window to display what the screens are actually displaying.

Another aspect of the invention is represented in an apparatus and method for an integrated REMOTE-LEARNING facility. The delivery of educational information may be over a network system, a cable or related systems, a DVD or CD-ROM system, or any other classroom technology which may use a combination of various systems.

A further aspect of the invention relates to a unique software. The software product, in accord with this aspect, includes at least one machine-readable medium and programming code, carried by the medium. A computer readable medium, as used herein, may be any physical element or carrier wave, which can bear instructions or codes for performing a sequence of steps in a machine-readable form. Computer-readable mediums include, but are not limited to, non-volatile media such as optical or magnetic disks, volatile media such as dynamic memory, and transmission media such as coaxial cables, copper wire and fiber optics. Transmission media may comprise acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, as well as media bearing the software in a scannable format, a carrier wave as described hereinafter, or any other medium from which a computer can read. A carrier wave medium is any type of signal that may carry digital information representative of the instructions or code for performing the sequence of steps. Such a carrier wave may be received via a wire-line or fiber-optic network, via a modem, or as a radio-frequency or infrared signal, or any other type of signal which a computer or the like may receive and decode.

BRIEF DESCRIPTION OF THE DRAWINGS

FIG. 2 shows an exemplary user interface for controlling information delivery in the multimedia environment related to the Super Teaching apparatus.

DETAILED DESCRIPTION OF THE INVENTION

The information delivery system and method represented by the present invention are based on increased level and duration of attention that results in improved retention of the material. The information delivery system is based on the theory that an automated configuration of multimedia in the classroom creates involuntary elevations in human concentration uniformly applied to the entire student body. Information is presented, repetitively, both in auditory as well as visual formats. Additionally, the system is a saturation learning method for stimulating both left and right side of the brain, with more integrated involvement of retention than when such multimedia instructor assistance in this format is missing from the classroom experience.

The present techniques implant stronger and more powerful impressions in more brain locations creating increased dynamic involuntary recall of newly acquired information. The level of attention is increased as the brain is continuously attracted to the lesson and finds it more interesting than other available stimulants. The focus of brain changes from one topic to another as the level of interest in the first one is diminished. The present invention, by creating an environment that is interesting to the brain, keeps the attention of the lesson and prevents "mind wandering" and depleted attention to the lesson. The brain is held on topic by the random pattern presented to the human senses to become the topic that the brain is most interested.

Flexibility of the system allows applications of different instructional plans without need for modifying the system following every classroom session. The system is operated at a high level of automation and application of technology for education within a typical classroom environment. Ease of operation of the system helps instructors to integrate the system into their classrooms because their interaction with technology requires virtually no retraining.

Figure 1A:
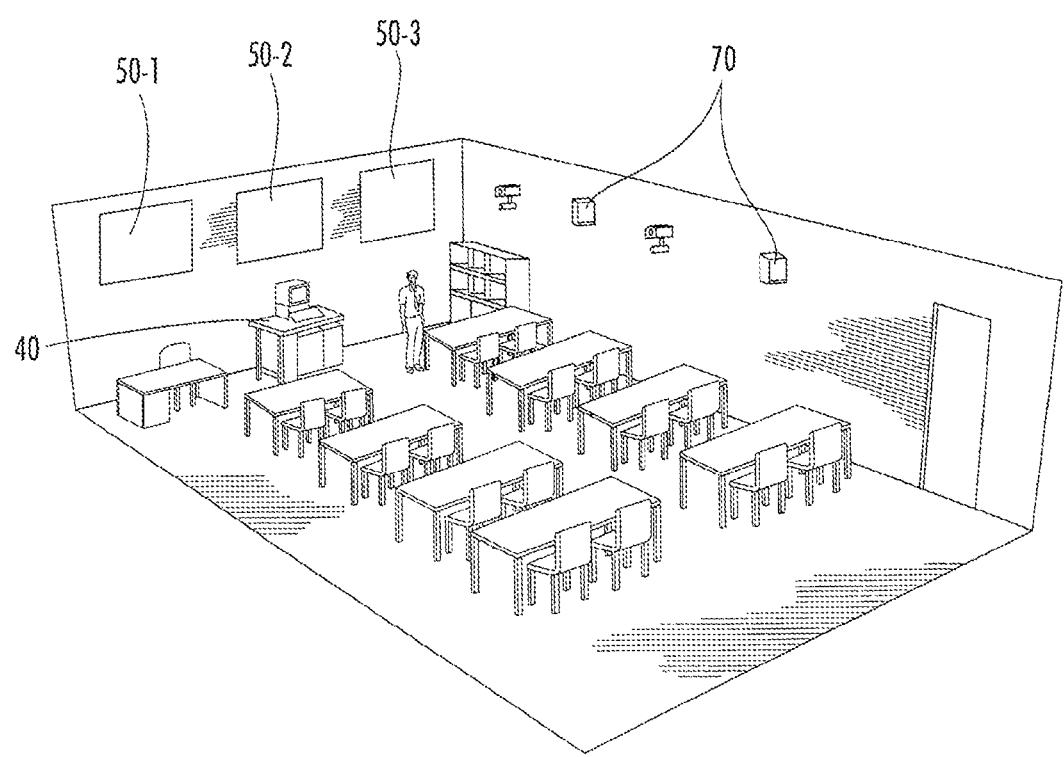
FIGS. 1A-1C show a classroom equipped with Super Teaching system and the detail of the display screens.
Figure 1B:
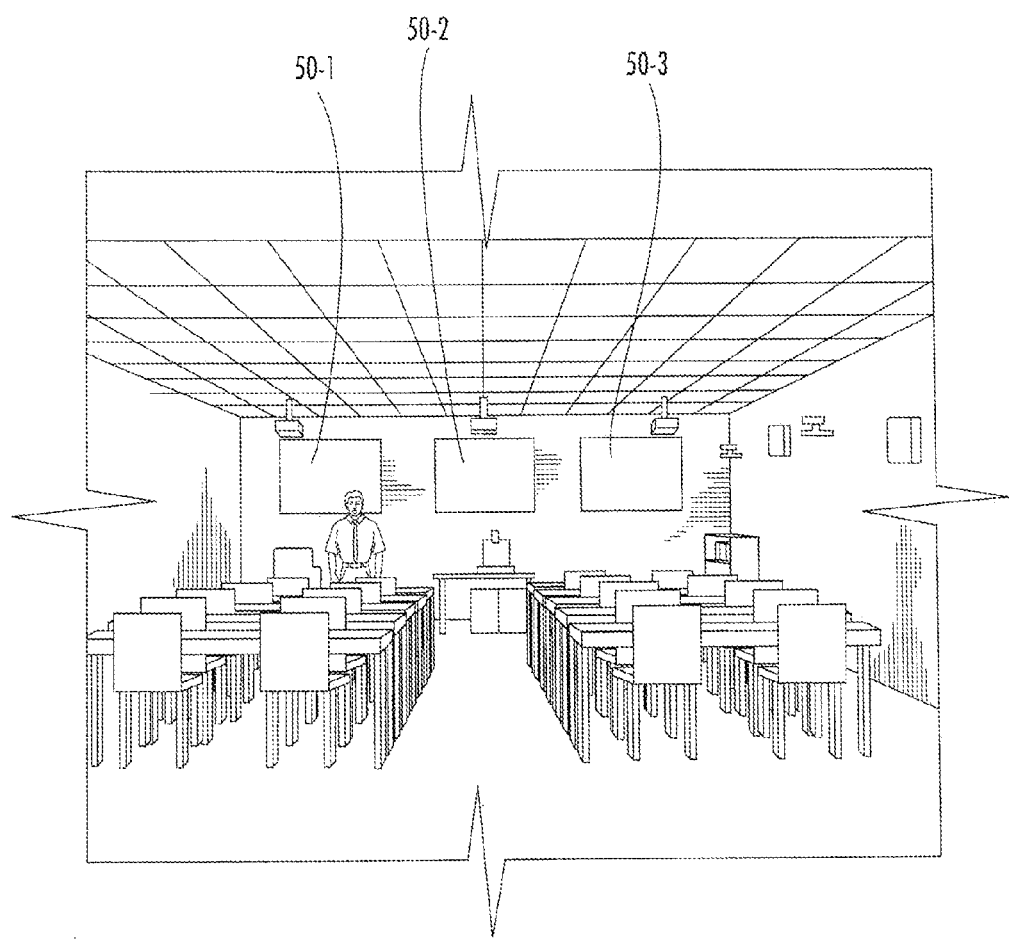

Referring now to FIGS. 1A and 1B, a classroom equipped with the present information delivery system is shown. Instructional information is delivered via three display screens 50-1, 50-2 and 50-3 that vary images with video wall like effect controlled by an algorithm residing in the hardware of the system. The three screens may be part of one large screen or separate devices. Each screen may be divided into portions displaying separate images. The audio part of the information is delivered to output devices such as speakers 70. Control interface 40 at the instructor's station provides a screen and an input device for the instructor to select one of the information sources available for receiving information or make changes to their settings. The control interface may be a part of a PC with a screen and input devices such as a mouse, keyboard, touch screen, or a stylus. The screen displays control buttons in graphical user interface format and an active source window to observe what is being displayed on the three display screens or any other output device. Details of the control display will be described later with regard to FIG. 2. The instructional information may be delivered to only display screens or speakers or both depending on the desired effect. The screens, with controlled patterns of display, substantially enhance information flow and impact the level of concentration achieved by the student to a higher level than what would have been possible without the effect of the present invention. The optimum number of display screens is linked to the cost of multiple screens in a classroom and the level of impact they have on improved learning and test scores. When the system is operated with three screens, the results showed optimum learning without unwanted distractions.

Figure 1C:
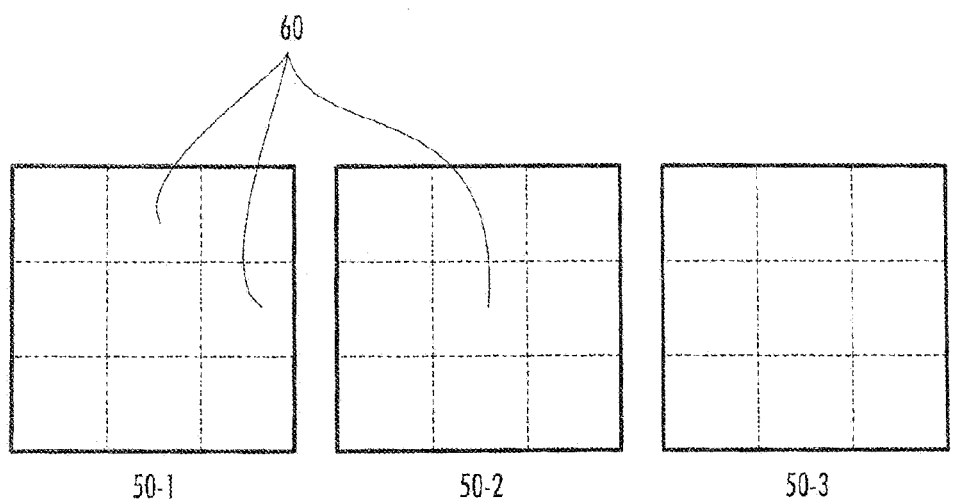

As shown in FIG. 1C, display system 50 includes three display screens 50-1, 50-2 and 50-3 where each screen is further divided into multiple areas. In FIG. 1C, each screen has nine display areas 60 although other numbers of display areas may be used. The display system alternatively includes a single wall screen on which multiple images are displayed on different parts of the screen. Each image area may, in turn, be divided into multiple areas. The screens are independently controlled so that different images may be shown in each area with different sequence and duration. Alternatively, one image may occupy all nine areas or any other divisions may be used to display images on parts or all of each display screen. An image in the form of wallpaper may occupy all the areas whereas another image is superimposed on one or more areas. Stored tables operated by the system software provide variables to mix and match images and preclude duplication of image pattern to minimum frequency.

The display control component of the software generates commands that are sent to servers for switching video images, partitioning each screen into display areas or provide special effect schemes. Displayed images may be manipulated by different special effects such as fader or mixer to provide for transition from one image to another or from one source to another. Similar control switches provide control and special effects for the audio output. In addition to switching between different audio sources, special effect, mixing and enhancing the audio quality are performed as a part of audio control. The audio parts of the information from distant sources, as well as local sources, such as microphones in the class, are processed to reduce the effect of echo and feedback.

The instructor is able to override the format as well as the sequence of information displayed by manipulating the control buttons displayed on instructor's control panel. Overriding the control by the software of the displayed information, the display can be modified or additional information may be displayed, as the instructor finds suitable. The override capabilities affect the way information is displayed as well as its content. Other input sources such as cameras, remote learning, Internet and other audio/visual sources may provide additional or overriding images for display. The override option enables the instructor to match the lesson to the class characteristics or updates that have recently become available. The control may be reverted back to the software at any time that the override option is not needed.

Another capability that, similar to the override option, allows flexibility and instructor's input during the instruction, is the annotation device. Notes and comments related to various sections of the instruction plan are added through annotation device that overlays an image of the comments onto the video output. The instructor interaction and manipulation of the data sources or devices are achieved through a computer system using any known human-computer interface devices. Upon input by the user, the computer updates the environment in response to the instructor's input through the keyboard, mouse, touch pads or stylus. The computer then provides feedback to the instructor by displaying information on the screen. The software is configured to provide user-controlled graphical objects such as a graphical representation of the actual control buttons of data source devices. The display of the graphical representation of the control buttons of a device allows the user to simply select and "push" buttons in the same way an actual device is operated.

Specific details of how the instructor controls data sources or devices that provide video images or audio data are shown in FIG. 2. The example shown here is displayed on a monitor in the form of a touch panel or may receive input from different input devices such as keyboard, a mouse, a stylus and a touchpad. In the case of touch panel, the screen has touch control capabilities that requires only touching the displayed button when a selection is to be made. User interface 210 shown here is an example of displaying a control panel for integrating various control components of the information delivery system in the classroom. Access to each source is included on the control panel through a graphical representation. A specific control panel is displayed for each source when that source is selected on the control panel. The interface for each source control panel emulates the control buttons that are typically present on the actual equipment. For example, a VCR control panel has PLAY, STOP, and PAUSE, etc. buttons, in a configuration similar to those on the actual equipment, displayed on the screen. Similarly, other sources such as cameras, microphones, DVD and cable tuners have their specific control panel displayed on the screen. In case of implementing a touch screen display, the device control panel provides for easy selection and manipulation of displayed information without excessive interruption of the class instruction. A display area on the left hand side of the touch panel is specified for displaying graphical representations or icons related to various data source devices. The selection of a multimedia component shown on the left hand side of the screen causes the control panel associated with that source to be displayed in window 220 for source control panel. Additional device control panels may be simultaneously displayed in window 220, which will be sized to fit more control panels.

Additionally, active video source window 240 may be displayed on the remaining area of the touch panel to enable the instructor to observe the information that is actually displayed on three display screens in the classroom without need for looking up and away from the control screen. Images from the cameras or other data sources may be displayed in the active source window for instructor's view before, or simultaneously, with the display on the classroom screens. Since the PC and the software are Windows®-based and run on current version, other Windows® capabilities for displaying the active video source window and device control panels may be used to modify the way each window is displayed or hidden. Using the device control panels and manipulating the controls for each device, the instructor provides his/her input to the lesson before the lesson begins. These instructor input commands combined with the control instructions of the software, according to a set of rules enforced by the software, provide the information for display on the three display screens, manipulate images shown to the classroom in different combinations of audio or video effects and incorporate instructor's inputs into the audio and video outputs. The integrated display of information and instructor's interaction is applied as a seamless learning tool for achieving a high degree of retention and recall of the material.

The control screen of FIG. 2 further enables information from video players, DVD, cable, disk drive, digital camera or Internet be displayed in any pattern that is selected by the instructor. A video STOP icon further overrides the automatic image input by replacing rule-driven patterns contained in the software. Thus, the instructor interjects additional information, as the students' specific learning state requires. For example, the instructor selects the camera icon and a camera control dialogue box is displayed. Through another selection of the active source button, the actual image displayed by the active source is shown in window 240 of FIG. 2. The instructor adjusts different aspects of the display by manipulating the control buttons of the cameras control dialogue box. Once the images from VCR are ready to be shown, the camera control panel is closed and the VCR control dialogue box comes up on the screen. Therefore, the interactive aspect of the system is integrated with the software driven sections where the instructor may elect the icon for camera and full screen display and include camera images displayed on all three screens and later go back to the software routine and software-selected images from the VCR. Additional interactive effects such as voice or microphone activation for students may be selected from the control panel for full instructor-student interaction.

Similar control commands related to the content and sequence of displayed information may be received from a remote control device in the instructor's control panel. The remote control provides control over each data source in a somewhat-limited way without the graphical interface and the active source display window. However, the remote control option frees the instructor from the desk or console at the instructor's station where the graphical user interface is displayed on a screen and adds to the flexibility in movement of the instructor or positioning the information display components in a classroom.

Image deliveries are special effect-induced with a table containing rules for providing multiple effects for displaying images with optimum visual impact, such as wipes, swipes, folds, page turn, etc. combined with complimenting audio effects. Timing of the display pattern is also controlled by the system software and the related rules table and provides different effects by either simultaneously changing the images or replacing/rotating them at different intervals. Specifically, selected images provide the background pictures for idle or transition periods when no other activity on the screens is present. Time limits for duration in which displaying each kind of image, such as instructor's face, students' image or other info, are built into the software to allow maximum effectiveness without unwanted distraction from the core educational aspect of the lesson. The instructor further controls the duration and type of display using control buttons and keys on the control screen of FIG. 2. Different types of information such as Internet pages, presentations or spreadsheets and announcements, may be displayed in moving, redundant patterns, which reintroduce and reinforce the information as instructor and students interact and compels higher attention.

The system rotates images by default, using table driven time-outs or conditional loops to alter images appearing on the screen. At any time interval, images may be overridden by instructor to place a single source image on all three screens in two modes. First override mode provides a time out to again move images after variable default. The system remembers previous time outs, and varies the pattern to provide maximum alternatives. In the second mode, images remain static and will not rotate until the instructor selects the first mode. The system may also vary patterns, change the number of areas each screen is divided into or move data for redundancy, and involve the instructor and students interactively to elevated concentration and retention. Special images in a predetermined combination may be selected to promote higher level of interaction and minimize distraction.

The present system, unlike those using fixed components, remains up to date as an information delivery and display resource because the display media can be updated with newer tools as they enter the market. For example, the display screens may be replaced at any time with higher resolution models while improved speakers may enhance the audio part. The control scheme of the entire system may also be updated as more powerful hardware and software components are introduced. This built-in flexibility adds to the value of the tool since new components replace the old ones without changing the relationship among various parts or the overall method of delivery of information. Examples of upgradeable components are computers, graphical tools, and Internet friendly software and multimedia software. Virtually all of these components can become obsolete quickly. However, with the built-in flexibility, the pressure of modernizing the classroom is reduced and the question, as to what the best technology decision for the next generation is, may be answered more easily. Installations, while only slightly more costly than a typical computer lab in a modern high school, remains current as a technology for decades. The overall program affordability when weighed against achieving the long-term missions, makes the present invention a wise choice for cost-conscientious entities.

The present invention operates as an automated system, with minimal direct instructor involvement. The primary benefits from the instructor's point of view are ease of use and degree of automation that provide flexibility without retraining. Cumbersome equipment such as white boards, black boards and overheads are removed. Additionally, existing instructor notes may be used without any modifications and instructors continue the delivery of lessons with minimal retraining, such as about one day. From the students' point of view, classrooms become fun to participate in, while test scores are improved. Fast delivery of images, sounds or any type of data keeps students interested and elevated concentration and retention are achieved. Moreover, students are distracted less, having elevated motivation and learning experience.

Figure 3:
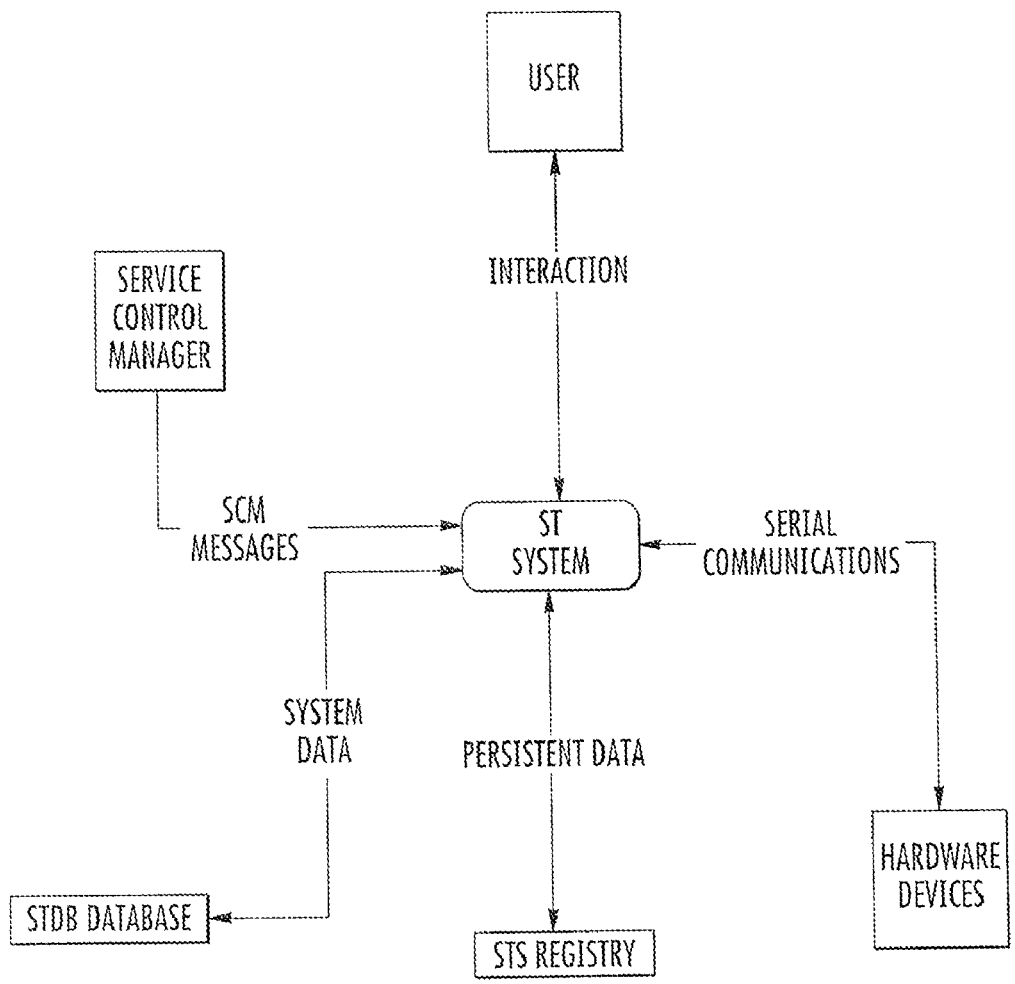
FIG. 3 depicts an overview of the information delivery system of the present invention.

Referring to FIG. 3, a schematic view of the information delivery system is shown. When the power is turned on, a service control manager starts up the system, checks the registry and starts all the device servers. The system remains in an inactive state with all the data devices ready in the background. The main system, which controls all the components of information delivery, interfaces with the user through interactive commands entered in the control panel of FIG. 2. Hardware devices and data sources are accessed through serial communications and connected to the output devices and the main system. Each data source device communicates in its specific language to a device server that monitors and controls that specific device. As soon as a data source is ready to provide data, the display control component of the software dictates the combination of different types of data to be delivered to the three display screens according to the conditions controlled by a predetermined set of rules. A collection of databases providing conditions for text, image and audio data and their output sequence, duration and pattern provide input to the system while a system registry provides other data. The collection of databases includes topics and general background information or accompanying material that may be catalogued according to topic, audience and customized criteria.

With the seamless control and data retrieval scheme of the system, there are only minimal requirements for instructor involvement. The system is designed to assist professional educators with minimal technology skill from the educator-user. Instructions occur every day, precisely as they did prior to the addition of the present system, requiring no substantial change. With most alternative technologies, substantial instructor retraining is required so that the educator can adapt to the technology. The present system is adapted to the educator, not the other way around, and stands in the forefront because of instructor-assisted design criteria.

The system, as shown in FIG. 3, allows for introduction of additional third party medium materials into the classroom. These materials may include written words, pictures, videos or slides and portions of publications. More difficult-to-display materials such as three-dimensional objects, presentations, Internet pages and images from remote sites or other audio-visual medium may also be added to the lesson without any additional programming or interruption. These materials may be integrated into the lesson as another piece of data from a data source and may even be added to the database. Such educational materials are delivered into the classroom, integrated with the system and provide accelerated learning that automates information delivery and speeds up learning without pause, reset or delay. The system becomes a seamless, virtually automated, instructor-assisted technology operating in real-time mode.

The present method and the system for information delivery is composed of specific software designed for integrated teaching and of various off-the-shelf technologies, utilized as an integrated learning system. The equipment incorporated into the system, for example, include:

Processors such as Dell Dual-Processor Server with ST Software

Figure 4:
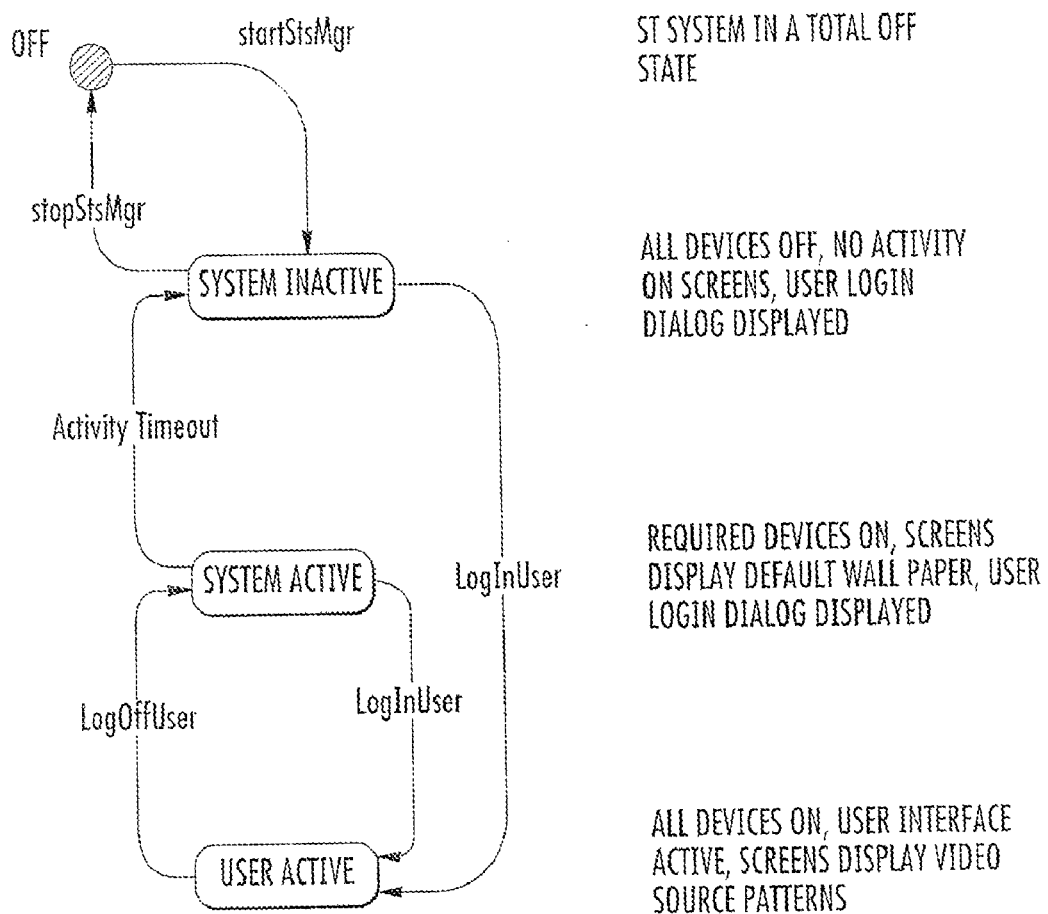
FIG. 4 shows a diagram of different states of the system during active and inactive periods.

Display components including three display screens such as Da-Lite 73650 motorized projection screen Display support, instructor robotic self-tracking cameras and student-sensitive tracking cameras such as Sony EV1-D100 pan-tilt camera, ICI WM30B camera mount, Sony VID-P110 document camera and document camera motion detector Annotation device such as Boeckeler annotation system PVI-44D Data sources such as JVC SR-365U VHS VCR, Pioneer DVD-V7400D DVD player, Pioneer 300 DVD changer DV-F07 and Contemporary Research 232-STA tuner/demodulator Video equipment such as AutoPatch 8Y-XL 24×48 composite video switcher, Zandar MX16 multiviewer, Extron SVS100 seamless video switcher, Sanyo PLC-XP30 3000 Lumens LCD projector, Leitch 2204-2T dual TBC-IV, Antec TVAtor II scan converter and Viewcast Osprey 200 Video Capture Card Audio equipment, surround sound system and speakers such as Crown CM-31W60 ceiling microphones, EAW L8CX2X0 ceiling speaker, JBL Control 25 speaker, QSC CX 254 amplifier, Gentner XAP-800 digital echo canceller, Gentner PSR1212 digital signal processor and Atlas/Soundoller EQ818 speaker black box Support hardware such as Da-Lite interface controller, Polycom Codec VS4000 with PRI T1 interface, SurgeX SX2120 surge suppressor, Advantech PCI-1760 relay card, Cyclades Cyclom-YeP 32-port serial port unit and SurgeX SX20-NE surge suppressor Cabinets such as Middle Atlantic rack unit Instructor Station with touch screen monitor and stylus (providing graphical user interface) such as Elo 18" Intelli Touch, touch screen monitor Microphones such as Shure UC14/83 lavaliere wireless microphone and Shure UC24/58 handheld wireless microphone One instructor-operated overhead, self-focusing, industrial grade camera/overhead white board Cables and connectors DVD, video and cable interface Internet interface on high speed access Turning to FIG. 4, a diagram, showing different ON/OFF states of the system, provides different stages of standby and inactive modes. In an OFF state, the system is in a complete shut down state where power may also be cut off from the system. The system is started into an inactive mode in which all devices are off and no display on the screen may be present except for the user-login dialogue box. Upon successful completion of a login process, all devices are turned on, the user interface becomes active and the display screens show image patterns from a default video source. However, when the user logs off, the user is taken back to the system active mode, which either allows them to stay in the user interface inactive mode or login another time and cause the user interface to become active. In the system active mode, the required devices are on, the user login dialog box is displayed and the screens display default wallpaper images. A built-in timer measures the period of inactivity, and if it exceeds a certain limit, it automatically takes the system back into the inactive mode. From the inactive mode, the system manager could shut down the system in order to go into the OFF state or allow for further user login by displaying the user login dialog box.

Educators apply the present invention as an integrated single system to promote learning via the Internet, remote learning, cable, VCR, DVD, CD-ROM, computer software programs and via live in-classroom interactive media. Contrary to educational applications, where the system in the classroom is typically one monitor or TV set, the present invention delivers educational content via three display screens that vary images with video-wall-like effects in algorithmic patterns that enhance attention and retention. The software used in the system provides the steps for a method of information delivery via the main system by manipulating images displayed in the classroom.

The implemented software architecture is a rule-based system that includes a group of databases and sets of predetermined rules. A rule-based configuration relies on the set of rules that are programmed in a procedural computer language. Different sets of rules are determined and measured according to the results of brain-learning processes and how the optimum rules correspond to increased test scores for the students who benefited from the system. The software uses an auto-switching algorithm that follows the sequence and values obtained based on the rules applied to the content of a related database. For example, if the instructor selects the instructor camera, the algorithm causes activation and deactivation of a series of other sources. Some sources may be combined together or with other sources as secondary sources in the background to provide the displayed images. The conditions imposed by the applicable rules in the system software and the related databases determine particular display sequence, display duration and the combination of images on different areas of each screen.

The system starts up from OFF state to inactive mode and allows user login when dialogue box appears and allows login information to be inputted. The system is based on Windows®-based operating system and is configured for compatible graphical user interface for controlling the data sources. After successful login and entering user interface active state, default nodes such as the camera, VCR or microphone are activated and provide audio and visual information to be displayed on the screens. The system is based on a three-tier model which includes data/source layer, application layer and user interface layer. Databases and data sources are in the first layer and provide the content of displayed information and may include databases, audiovisual-data-source devices or remote sources.

A rule-based software controls the hierarchy and the sequence for displaying images from these sources of data. After the start-up stage, the data layer makes all servers check their corresponding registry to ensure that all devices are on and communicating properly. The middle application or meta layer operates the communication between user interface and data layer through corresponding servers. For example, in order to start the VCR and run the system, the application layer handles the logic according to the predetermined set of rules and communicates through the corresponding server the necessary control commands to the VCR. After the VCR is started, the application layer provides any feedback or status data received from the VCR to the user interface and/or the data layer.

At least portions of the invention are intended to be implemented on, or over, a network such as a LAN, WAN or the Internet in order to share the information or receive additional lessons to be combined with the one in session. The network connection may take place in order to share the lesson with a remote location or receive information and/or participate in interactive discussions with other classrooms. Alternatively, Internet users who are interested in the topic or require class attendance while being away, i.e., absent students and correspondence course participants may share the instructor in the classroom.

Figure 5:
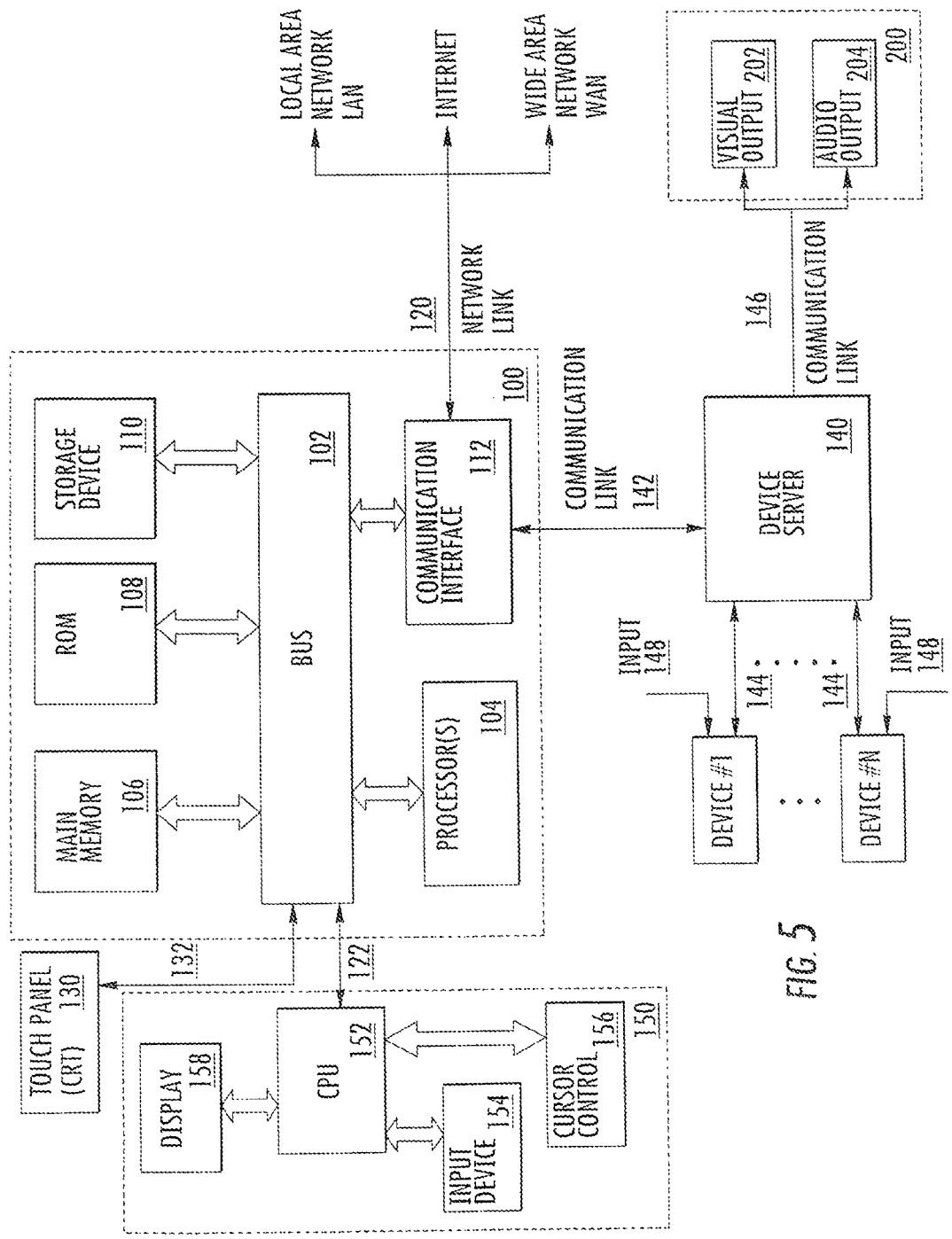
FIG. 5 shows a diagram of the computer system configured for performing the steps of information delivery method according to the invention.

An example of such a network is described in FIG. 5 depicting a block diagram that illustrates the main server system as computer system 100 upon which an embodiment of the invention may be implemented. System 100 includes a bus 102 or other communication mechanism for communicating information, and one or more processor(s) 104 coupled with bus 102 for processing information. System 100 also includes a main memory 106, such as a random access memory (RAM) or other dynamic storage device, coupled to bus 102 for storing information and instructions to be executed by processor(s) 104. Main memory 106 may also be used for storing temporary variables or other intermediate information during execution of instructions to be executed by processor(s) 104. System 100 further includes a read only memory (ROM) 108 or other static storage device coupled to bus 102 for storing static information and instructions for processor(s) 104. Storage device 110, such as a magnetic disk or optical disk, is provided and coupled to bus 102 for storing information and instructions.

User interface at the instructor station is achieved through terminal 130 that provides a touch panel incorporating the control elements shown in the control panel of FIG. 2. The touch panel may be a cathode ray tube (CRT) or any other medium for display and input. Communication link 132 connects the touch panel to the main system through bus 102. Computer system 100 may be coupled via bus 102 and communication link 122 to personal computer (PC) 150 having display 158, such as a cathode ray tube (CRT), for displaying information to a PC user. Other output devices such as printers may be used for providing information to the user. PC 150 is used at the instruction station and may provide data as another data source device. It includes processor (CPU) 152 where an input device 154, equipped with alphanumeric and other keys, is coupled to PC 150 for communicating information and command selections to system 100. Other user input device is cursor control 156, which includes devices such as a mouse, a trackball, or cursor direction keys for communicating direction information and command selections to PC 150 and for controlling cursor movement on display 158. This input device typically has two degrees of freedom in two axes, a first axis (e.g., x) and a second axis (e.g., y), that allows the device to specify positions in a plane. The input device and cursor control support the graphical user interface on the display.

Main system 100 operates in response to processor(s) 104 executing one or more sequences of one or more instructions contained in main memory 106. Such instructions may be read into main memory 106 from another computer-readable medium, such as storage device 110. Execution of the sequences of instructions contained in main memory 106 causes processor(s) 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor(s) 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables; copper wire and fiber optics, including the wires that comprise bus 102. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read. Various forms of computer readable media may be involved in carrying one or more sequences of one or more instructions to processor(s) 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector can receive the data carried in the infrared signal and appropriate circuitry can place the data on bus 102. Bus 102 carries the data to main memory 106, from which processor(s) 104 retrieves and executes the instructions. The instructions received by main memory 106 may optionally be stored on storage device 110 either before or after execution by processor(s) 104.

System 100 also includes a communication interface 112 coupled to bus 102. Communication interface 112 provides two-way data communication coupling to device server 140 through communication link 142. A serial communication link, such as RS232 may be used for link 142, although other types of communication links can be used according to the specific data transfer configuration. Device server 140 communicates with data sources or devices #1 through #N, such as VCR, camera and microphone, etc. and receives feedback data from each device using communication links 144. Each device may be accessed through its direct input 148, which is usually the buttons and control panel associated with that particular device. Device server 140 transmits commands and data from the main system and the devices over communication link 146 to output 200. Same data is available for display on the monitor of instructor's station in the active source window, described in FIG. 2. Data from each device is controlled and modified according to the instructions in the software before delivery to the server for display on visual output 202 or broadcast on audio output 204. Device server 140 provides data, sequence and timing of information delivered to output 200 according to a set hierarchical scheme in the software instructions, instructor's input or any other active control features.

Additional links are made to network link 120 that is connected to a local network (LAN), a wide area network (WAN) or the Internet. For example, communication interface 112 may be an integrated services digital network (ISDN) card or a modem to provide a data communication connection to a corresponding type of telephone line. As another example, communication interface 112 may be a local area network (LAN) card to provide a data communication connection to a compatible LAN. Wireless links may also be implemented. In any such implementation, communication interface 112 sends and receives electrical, electromagnetic or optical signals that carry digital data streams representing various types of information. Network link 120 typically provides data communication through one or more networks to other data devices. All networks use electrical, electromagnetic or optical signals that carry digital data streams. The signals through the various networks and the signals on network link 120 and through communication interface 112, which carry the digital data to and from main computer system 100, are exemplary forms of carrier waves transporting the information.

Computer system 100 can send messages and receive data, including program code, through the network(s), network link 120 and communication interface 112. In the Internet example, a server might transmit a requested code for an application program through Internet, local network and communication interface 112. Processor(s) 104 may execute the received code as it is received, and/or stored in storage device 110, or other non-volatile storage for later execution. In this manner, computer system 100 may obtain application code in the form of a carrier wave.

Although the present invention has been described and illustrated in detail, it is clearly understood that the same is by way of illustration and example only and is not to be taken by way of limitation. One skilled in the art could also vary the design of the features described using known elements to accomplish what is described in this disclosure without departing from the principals that are described.

The invention claimed is:

1. A computer implemented delivery system for instructional information comprising:

at least one source that provides data, the data comprising instructional information and background information;

at least one user interface that receives input from a user, the input related to execution of the data;

a plurality of output devices in a classroom that receive audio and visual components of the instructional information and background information, wherein the plurality of output devices includes at least three visual displays and wherein display of the instructional information is controlled by an operator and display of the background information is controlled by an auto-switching algorithm;

at least one processor that generates audio and visual components from the instructional information and background information from provided data to at least one output device;

a computer-readable medium accessible by the processor and including at least one predetermined rule comprising instructions for displaying instructional information selected by the operator on the visual displays until a triggering event;

displaying the instructional information in a random pattern on one or more of the visual displays in response to the triggering event, wherein the random pattern comprises displaying the instructional information in a random sequence wherein the instructional information moves from one combination of one or more of the visual displays to another combination of one or more of the visual displays at a random interval, wherein a combination of the one or more visual displays comprises a number of the visual displays less than all of the visual displays; and displaying background images of the background information on one or more visual displays not displaying instructional information, the background images displayed and replaced by the auto-switching algorithm that controls selection, sequence, and duration of the display of the background images; and communication links that transmit data and information between the at least one source, the user interface, the processor and the output devices.

2. The computer implemented delivery system of claim 1, wherein said at least one source comprises at least one of VCR, DVD, cameras, audio tuners, Internet and PC-based presentations.

3. The computer implemented delivery system of claim 1, wherein said at least one predetermined rule determines order and sequence in which data from each source is to be applied to the output devices.

4. The computer implemented delivery system of claim 1, wherein said input from a user determines which source provides data.

5. The computer implemented delivery system of claim 1, wherein each of the at least three visual display devices is further divided into a plurality of viewing areas in a predetermined pattern.

6. The computer implemented delivery system of claim 5, wherein at least one visual display device is divided into two or more unequal viewing areas.

7. The computer implemented delivery system of claim 1, wherein each of the at least three visual display devices is further divided into a plurality of viewing areas in a pattern different from the other visual display devices.

8. The system of claim 1, wherein the at least one predetermined rule further includes displaying a random sequence of the background images on each of the at least three visual displays after expiration of a timeout period.

9. The system of claim 1, wherein the triggering event comprises receiving a command from the operator.

10. The system of claim 1, wherein the triggering event comprises a predetermined time for displaying the instructional information.

11. The system of claim 1, wherein the at least one predetermined rule further includes displaying random special effect transitions of one or more of the background images and the instructional information being displayed on each of the at least three visual displays.

12. The system of claim 1, wherein the at least one predetermined rule further includes displaying one or more of a student image of a student in the classroom and a teacher image on the display system on one of the at least three visual, displays.

13. The system of claim 1, wherein displaying the instructional information in a random pattern further comprises displaying the instructional information in a random pattern for a predetermined period of time, wherein one of background images and additional instructional information is displayed after the predetermined period of time.

14. The system of claim 1, wherein first instructional information is displayed in a random pattern along with second instructional information, wherein the first instructional information is displayed with a first random pattern and a second instructional information is displayed with a second random pattern.

15. The system of claim 1, wherein the at least one predetermined rule further includes displaying background images during idle or transition periods on the display system on each of the at least three visual displays.

16. The system of claim 1, wherein the at least one predetermined rule further includes displaying previous information provided by the operator to reinforce the previous information on each of the at least three visual displays.

17. The system of claim 1, wherein the at least one predetermined rule further includes displaying new information provided by the operator when the operator overrides auto-switching algorithm on the display system on each of the at least three visual displays.

18. The system of claim 1, wherein the at least one predetermined rule further includes displaying background images that are related to the instructional information.

19. The system of claim 1, wherein the at least one predetermined rule further includes displaying background images that are unrelated to the instructional information.

20. The system of claim 19, wherein the unrelated background images are selected from the group of pictures consisting of: animals, forests, rivers, clouds, mountains, art work, people, buildings, vehicles, tools, plants, minerals, geological items, scenic sights, maps, cartoon images, segments of movies, segments of videos, and web site images.

21. The system of claim 19, wherein the unrelated background images are selected from the group of pictures consisting of: books, astronomy images, zoology items, biology items, historical items, futuristic information, economical information, financial information, statistical information, science fiction, fiction, scientific information, and theological information.

22. The system of claim 18, wherein the related background images are selected from the group of pictures consisting of: books, astronomy related images, mathematical related images, zoology related items, biology related items, historical related items, futuristic related information, economical related information, financial related information, statistical related information, science fiction related information, fiction related information, scientific related information, and theological related information.

23. The system of claim 1, wherein the at least three visual displays are viewable on a single display screen.

24. The system of claim 1, wherein the at least three visual displays are viewable on three distinct display screens.

25. A computer implemented delivery system for instructional information consisting essentially of:
   at least one source that provides data, including an image capture device, the data comprising instructional information and background information;
   at least one user interface that receives input from a user, the input related to execution of the data;
   a plurality of output devices in a classroom that receive audio and visual components of the instructional information and background information, wherein the plurality of output devices includes three visual displays and wherein display of the instructional information is controlled by an operator and an auto-switching algorithm and display of the background information is controlled by the auto-switching algorithm;
   at least one processor that routes audio and visual components from the instructional information and background information from provided data to at least one output device;
   a computer-readable medium accessible by the processor and including instructions for:
      displaying instructional information chosen by the operator on the three visual displays until a triggering event;
      displaying the instructional information in a random pattern on the visual displays in response to the triggering event on one visual display at a time, wherein the random pattern is controlled by the auto-switching algorithm and comprises displaying the instructional information in a random sequence wherein the instructional information moves from one of the visual displays to another one of the visual displays at a random interval, the auto-switching algorithm controlling sequence and duration of the display of the instructional information; and
      displaying in response to the triggering event background images of the background information on the three visual displays not displaying the instructional information, the background images displayed and replaced at random by the auto-switching algorithm that controls selection, sequence, and duration of the display of the background images; and
   communication links that transmit data and information between the at least one source, the user interface, the processor and the output devices.

26. The computer implemented delivery system of claim 25, wherein the user interface includes a screen and an input device.

27. The computer implemented delivery system of claim 25, wherein the source includes a microphone.

28. The computer implemented delivery system of claim 25, wherein the computer-readable medium includes instructions for enabling the operator to enter direction regarding image display through the user interface and instructions for carrying out such direction.

29. The computer implemented delivery system of claim 25, wherein the computer-readable medium further includes instructions for applying special effects to images.

30. The computer implemented delivery system of claim 1, wherein the auto-switching algorithm replaces displayed background images with varying patterns selected with table driven timeouts and the auto-switching algorithm displays and randomly moves the instructional information after the triggering event with table driven time outs.

31. The computer implemented delivery system of claim 30, wherein the table-driven timeouts preclude duplication of image pattern to a minimum frequency.

32. The computer implemented delivery system of claim 1, wherein the auto-switching algorithm replaces displayed background images according to a random duration with random background images.

33. The computer implemented delivery system of claim 1, wherein the auto-switching algorithm selects input sources for the background information supplying the background images.

34. The computer implemented delivery system of claim 1, further comprising an operator override for the auto-switching algorithm for one or more visual displays.

35. The computer implemented delivery system of claim 1, wherein the auto-switching algorithm changes display of the instructional information from one set of the one or more of the at least three visual displays to another set of one or more of the at least three visual displays and wherein the auto-switching algorithm moves the background images of the background information to one or more visual displays not displaying instructional information.

36. The computer implemented delivery system of claim 1, wherein the operator changes display of the instructional information from one set of the one or more of the at least three visual displays to another set of one or more of the at least three visual displays and the auto-switching algorithm moves the background images to visual displays not displaying instructional information.

* * * * *